Jan. 7, 1936.  M. A. BISPHAM  2,026,930
FASTENING DEVICE
Filed Aug. 27, 1934
Fig. 1.
Fig. 2.
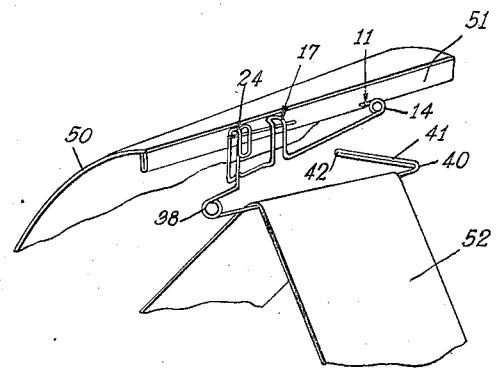
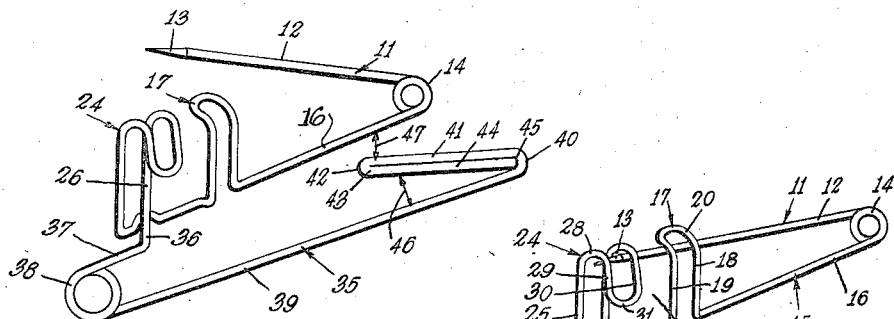
Fig. 3.
Fig. 4.
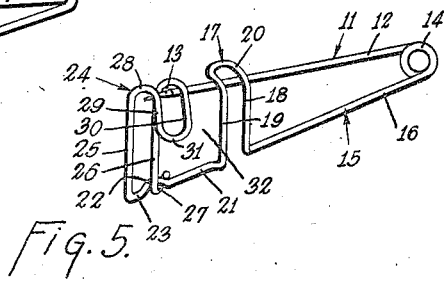
Fig. 5.
Inventor
M. A. Bispham
by Hazard and Miller
Attorneys.

Patented Jan. 7, 1936

2,026,930

UNITED STATES PATENT OFFICE 2,026,930

FASTENING DEVICE

Mabel Alma Bispham, Los Angeles, Calif.

Application August 27, 1934, Serial No. 741,652

14 Claims. (Cl. 24—73)

My invention relates to a fastening device in which I employ a safety pin or the equivalent for attaching the device as a whole to a garment, and attached to or incorporated with the safety pin I employ a hook or suspending element.

A particular application of my invention is in women's garments in which sleeveless types of dresses are worn and in which the safety pin is secured to the inside of the shoulder straps of the dress and the hook or suspending device is used to engage the shoulder straps of a slip or other under garment and thereby prevent the inner shoulder straps from slipping off the shoulders on to the arms and thus becoming exposed.

My invention as to the hook or suspending device consists of a straight bar with a retaining hook at one end. This, over the end of the hook with the shoulder strap of the slip may be fitted and such strap then rests on the straight bar. The hook thus prevents disengagement of the shoulder strap of the slip or inner garment from the suspending device and thus the inner shoulder strap is held in a close and covered relation to the shoulder straps of the dress or outer garment.

Another feature of my invention relates to the construction of the safety pin, and in this an object and feature of my invention is the provision of a double lock or securing element for the pin portion of the safety pin whereby the pin cannot accidentally become unfastened from the recess or socket in which it is engaged.

A further detailed feature of the safety pin portion of my invention relates to a retaining element which engages one side of the pin and makes it difficult for the pin to be removed from the hook or recess in which it becomes engaged when fastened to a garment. The hook portion of the pin is preferably made with a transverse bar or wire structure which is bent to form a hook open at one side. The retaining element engages the pin on the side of the open hook and thus the pin must be given a double bend to unfasten the same, the first bend being to release the pin from the open hook and the second bending motion to release the pin from the retaining element which latter is slightly bent over the upper side of the pin when the safety pin is positioned with the pin portion uppermost.

Another further detailed object and feature of my invention is making the safety pin portion of the device of a single piece of wire this being bent to have two transverse portions, these having a reverse bend and being formed in the manner of an open sided hook at one end of the safety pin. The wire is formed with a loop giving a spring, and has a straight section connected between the hook and the spring except that there is a transverse bent portion having a reverse bend and forming an open sided hook facing in the opposite direction to the end hook. Thus the pin portion which extends from the loop or coiled spring engages both of the hook or loop sections having the reverse bend on opposite sides and is therefore locked in position when engaged in both of the hooks.

A further detailed object and feature of the retaining or fastening device used in connection with the safety pin is forming this as a continuation of the wire of the safety pin by coiling one of the transverse members of the safety pin hook to form a loop, then, from this loop there extends a straight section for supporting the shoulder strap of the inner garment. At the end portion of the straight section there is a reverse bent portion of the wire forming an open type of hook. If desired, the extreme end of the wire may be reversely bent back parallel and contiguous to the open hook portion of the shoulder strap holder.

My invention is illustrated in connection with the accompanying drawing, in which:

Fig. 1 illustrates my invention in use.

Fig. 2 is a perspective view with the garment broken away showing the application of my invention.

Fig. 3 is a perspective view with the safety pin portion of the device in the closed position.

Fig. 4 is a perspective view of the device with the safety pin portion in the opened position.

Fig. 5 is a perspective view of a safety pin constructed in accordance with my invention.

In the description, I will first describe the safety pin portion of my device as a safety pin may be made incorporating part of my whole invention, and such pin has features which are a technical advance and improvement in the art.

This safety pin is designated generally by the assembly numeral 11 in which the pin portion 12 is pointed at 13 and as the whole of the safety pin may be made of a single piece of wire, this wire is formed into a spring loop 14 at the pivot end of the pin. The base of the pin 15 is formed by a straight wire section 16 and a partially open hook 17. This is made by having two parallel portions of the wire 18 and 19 bent at right angles to the base 15 and having a bent over-hook section 20 having a return bend. The bent over portion 20 forms with the straight portions 18 and 19 an obtuse angle so that the pin 12 is engaged on one side of the portions 18 and 19.

The remaining portion of the base of the pin is a straight wire section 21 which has a semi-circular bend 22 therein and a further straight section 23. The main hook 24 of the pin is formed by a transverse portion 25 of the wire, this being at right angles to the base and parallel to the sections 18 and 19. The portion of the wire adjacent the end has another transverse section 26 parallel to but spaced from the section 25 and the end is given a turn or kink 27 adjacent the semi-circular portion 22, to securely fasten the end of the wire to the base of the safety pin. The main hook is formed by reverse bends 28 in sections 25 and 26. The two downwardly extending portions 29 and 30 of the wire portions 25 and 26 respectively then have a return bend 31, the portions 29 and 30 being preferably substantially parallel to sections 25 and 26 respectively, but spaced therefrom, and the two parts 28 and 29 are spaced apart. This provides an open portion 32 on one side of the main hook 24 between the end 31 and the base of the pin.

To manipulate the pin for unfastening from its closed position of Fig. 3 it is necessary to depress the pin which is rotated on the coiled spring hinge or pivot 14 so that the pin may be pressed towards the base. The end is slightly sprung through the opening 32 so that the pin is clear of the sections of the wire 29, 30 and 31. The pin portion is then allowed to spring upwardly one side being in contact with the abutment wires 18 and 19, then the pin is sprung laterally in the opposite direction until it clears the partial hook 20, after which, due to the resiliency of the coil hinge or pivot 14, the pin portion occupies the position shown in Fig. 4.

From this construction it will be seen that the safety pin is positively locked in its closed position by having one side of the abutment sections 18 and 19 of the open hook 17 and the opposite side engaging the wires 25 and 26 of the main hook 24, and also the pin being confined by the reverse bent sections 29, 30 and 31 of the wire and the reverse bent section 20 of the abutment portion which has, as above mentioned, an obtuse angle bent in reference to the plane through the transverse portions of the wire 18 and 19.

The fastening or holding portion of my device may be constructed having a continuation of the wire used for the pin and such extension portion is designated by the assembly numeral 35. However, in this construction, it is not necessary to have the locking loop or turn 27 in the portion 26 of the wire but this loop may be used, if desired. Where such loop is not used, the portion 26 of the wire has an extension 36 downwardly below the base. A section 37 bent at substantially right angles to the portions 26 and 36 and in substantially the same plane as the base 15 and the pin 12 of the safety pin portion of the device. The wire is thus given a spring coiled turn 38 from which there is a straight section of wire 39. At the end of this straight section there is a reverse bend 40 and another straight section 41 at an acute angle to the section 39. If desired, the wire may terminate at 42. However, I find it preferable to have a reverse bend at the end 42 indicated at 43 and the portion 44 is contiguous to the straight section 41, the wire terminating at 45 in the acute angle formed at 40. The coil spring 38 which forms a pivot or hinge for the garment strap support is so tensed that normally the end 42 of the hook formed by the wire 41 and the wire 39 at an acute angle, will normally contact the base wire 16 of the safety pin, but the garment supporter designated by the assembly 35 may readily be forced outwardly so as to form a space 47 sufficient to pass the garment strap 52 through such space. Then, if the tension on the garment strap is not too great, the spring 38 will close this space 47, which, together with the acute angle formed by the wire 41, reduces the chances of the strap 52 accidentally becoming dislodged from the supporter 35.

In the use of my invention considered as a fastening device as a whole, a portion of a shoulder strap of an outer garment or dress is indicated at 50. (Note Fig. 2). This usually has a seam directly over the shoulders and the pin of the safety pin is bent through this seam as indicated at 51. As the straight bar section 39 is spaced from the safety pin portion of the device, the shoulder strap 52 of an inner garment such as a slip may be passed through the opening 47 until it engages the straight bar 39. Thus the hook formed by the straight bar 39 and the portions 41 and 44 retain the inner shoulder strap in position so that the shoulder strap cannot slip off this holding portion of the fastening and manifestly, the coiled loop 38 forms a closure at one end of this open hook. It is preferable to secure the pin in the shoulder straps of the outer garment so that the acute angle portion 40 is towards the wearer's neck. Therefore, the tendency of the inner shoulder strap to slip off the fastening device is prevented by the coiled end 38 and the portion of the wire 37.

Although I have described my holding device for the inner shoulder strap having straight bar 39 and the hook designated by the elements 39, 40, 41 and 44 attached to and forming an integral part of my improved safety pin, it is to be understood that this supporting portion may be incorporated with safety pins of other designs, in which case, the safety pin merely functions to hold the supporting element 39 in place in the outer garment, hence, broadly, the fastener or holder may be considered as an attachment to a safety pin.

An important feature of the safety pin portion of my invention which is shown as a separate article in Fig. 5, and combined with the garment supporter in Figs. 3 and 4, is that the semi-hook construction 17 is located in close proximity to the main hook 24. Hence there is an insufficient portion of the pin 12 between these hooks to be passed through a garment or other fabric to which it may be secured. Therefore there can be no direct pull of fabric between the semi-hook 17 and the main hook 24 tending to pull the pin portion of the safety pin out of the holding arrangement by such hooks.

Another feature of my invention resides in forming the semi-hook 17 with two parallel straight portions 18 and 19 extending upwardly from the base wire 16 and spaced apart and therefore the outer portion of the safety pin having the hook may be readily flexed or bent slightly sideways, the reverse bent portion 20 of the semi-hook functioning somewhat as a slight pivot. This allows the pin to be hooked in the main and semi-hooks without bending the pin, by merely moving the main hook laterally slightly to pass the pin 12 over the upper end of the semi-hook 17 and then allowing this main hook to swing back to its normal position in which the pin point 13 may be caught in the main hook.

Various changes may be made in the details of construction without departing from the spirit or scope of the invention as defined by the appended claims.

I claim:

1. A fastening device comprising in combination, a safety pin having a base portion formed of wire, a supporting device connected thereto and comprising a single section of wire attached to one end portion of the safety pin and having a spring loop forming a pivot, a straight bar section extending from the loop and a hook formed by an end portion bent in part at an acute angle to the straight bar, the base wire of the safety pin, the straight bar and the hook at the end of the bar being in substantially the same plane and the end of the hook being spacable from the base wire of the pin for inserting a strap of a garment to be supported by the straight bar.

2. A fastening device comprising in combination, a safety pin having a hook at the end of a base wire for engagement by a pin, a supporting device connected to one portion of the hook and formed by a single length of wire attached to the hook portion of the pin and having a first section substantially parallel to the base wire, a spring coil forming a hinge attached to said supporting device, a straight wire extending from the coil, a hook formed by a straight wire section at an acute angle to the free end of the straight wire portion and the base wire of the pin, the straight section of the wire and the hook portion on the end being in substantially the same plane, and the end of the hook portion being spacable from the base wire of the pin for insertion to a strap of a garment to be supported on the straight bar.

3. In a fastening device as claimed in claim 13, the wires of the semi-hook having a reverse bend forming an obtuse angle with the portions connected to the base wire, the main and semi-hooks being contiguous and so close together that there is an insufficient length of pin portion between the said hooks for attachment of a garment.

4. A fastening device as claimed in claim 1, the safety pin having a main hook extending from the base at the end to which the supporting device is connected, a pin having a pivotal connection to the other end of the base wire of the safety pin, and a semi-hook contiguous to the main hook, having a transverse abutment section extending from the base wire of the pin and engaging the opposite side of the pin from that engaged by the portion of the safety pin forming the hook, said semi-hook preventing the pin becoming unfastened from the main hook and the space between the main and semi-hooks being insufficient for fastening a fabric in the pin in such space.

5. A fastening device as claimed in claim 2, the safety pin having a pin portion pivotally connected to one end of the base wire of the pin, the main hook of the safety pin having a reverse bend and open on one side, and abutment means extending from the base wire transversely thereto adjacent the hook and having an obtuse angle bent on its end forming a semi-hook, the pin being adapted to be sprung to one side over the obtuse angle end and to have one side of the pin pressed against the abutment, the pin being adapted to enter the hook through the open portion, the closed part of the hook engaging the opposite side of the pin whereby the pin becomes locked in the hook by the said abutments, the main and semi-hooks being so close together that there is an insufficient length of pin portion therebetween for attachment of a garment.

6. A fastening device as claimed in claim 2, the safety pin being formed of a straight wire having two parallel portions transverse thereto and having a reverse bend, the portion adjacent the reverse bend being bent at an obtuse angle and forming a semi-hook, the pin portion being connected by a coil to the base wire of the pin, the main hook portion of the pin being formed of a transverse wire at right angles to the end of the base wire, a wire parallel thereto, contiguous the hook, forming the connection to the supporting device, the two latter wires having a bend in an opposite direction to the said obtuse angle bend, and forming a hook open on one side whereby the pin portion of the safety pin may be sprung to pass the said obtuse angle bend and to be inserted through the open side of the hook in fastening the pin, the main and semi-hooks being so close together that there is an insufficient length of pin portion therebetween for attachment of a garment.

7. A safety pin having a base wire with a main hook on one end, a pin pivoted to the other end and a semi-hook secured to the base wire and located in close proximity to the main hook, the main and semi-hooks having portions substantially in the same plane as that of the base wire, whereby the pin when in the fastened position is contacted on one side by the semi-hook and on the other side adjacent the point by the main hook.

8. A safety pin having a base wire with a pin having a resilient pivot to one end of said base wire and a main hook at the opposite end of the base wire, the main hook having a back portion extending upwardly from the main wire and having a reverse bend with a downwardly extending hook portion with an open space, a semi-hook having a back portion extending upwardly from the base wire and having its upper end bent at an obtuse angle in a direction opposite the hook portion of the main hook, whereby when the pin is in the fastened position a portion of the pin engages the semi-hook at substantially the obtuse angle and engages the main hook at the reverse bent portion thereof.

9. A safety pin as claimed in claim 8, the space between the main hook and the semi-hook being insufficient to accommodate fabric secured on the pin.

10. A safety pin having a base wire formed of an inner and an outer portion, the inner portion having a spring pivot with a pin extending therefrom, the outer portion having a main hook, said main hook having a back portion substantially in the plane of the base portion and having a reverse bend at the top with a downwardly extending hook portion, there being an open space between the lower end of the hook portion and the base base wire, a semi-hook having two back portions one attached to the inner and the outer portion of the base wire, the back portions of the semi-hook being connected by a reverse bend at the top, said reverse bend forming a partial pivot whereby the two portions of the base wire may be pivoted one in relation to the other, the said semi-hook being located in close proximity to the main hook, whereby one side of the pin is engaged by the back portion of the semi-hook and the back portion of the main hook when the pin is in its hooked position and there being insufficient space between the main and semi-hooks for securing fabric on the pin.

11. A safety pin formed of a single piece of wire having a pin portion, a coil pivot, a base wire formed of an inner and an outer section, a semi-hook formed of two parallel wire sections at the adjacent ends of the inner and outer sections of the base wire, said portions being at right angles to the base wire and spaced apart and having a reverse bend at the upper end, the semi-hook having an obtuse angle adjacent the reverse bend, the portion of the wire at the outer end of the outer portion of the base wire forming a main hook having two parallel wire portions at right angles to the base wire, an upper reverse bend, two downwardly extending portions connected by a reverse bend leaving an open space between the latter reverse bend and the outer section of the base wire, the pin portion when in its fastened position engaging substantially the obtuse angle bend of the semi-hook and the upper reverse bend of the main hook, the semi-hook and the main hook being contiguous one to the other spaced by an insufficient distance for fastening fabric on the pin between the main and the semi-hooks.

12. A safety pin as claimed in claim 11, the outer section of the base wire having an offset bend and one of the parallel wires forming part of the main hook having a free end crimped around the offset bend, thereby firmly securing the main hook to the base wire and stiffening the outer section of the base wire.

13. In a fastening device, a safety pin formed completely of one strip of wire, said pin having a base wire section, a coiled pivot and a pin portion extending from the pivot, a main hook formed by parallel back portions of wire at substantially right angles to the base wire portion and having a hook end open at one side, a semi-hook formed by two abutment wires formed integral with the base wire and transverse thereto, the said abutment wires when the pin is closed engaging one side of the pin and the other side of the pin engaged by the back portions of the main hook and thus to require a springing of the pin to pass the end of the pin through the opening of the main hook, one of the wires forming the main hook having an extension substantially parallel to the base wire, a coiled loop, a straight wire section and an end hook formed at an acute angle to the straight wire portion, there being a space between the end hook and the base wire for inserting the strap of a garment to be supported on the said straight wire.

14. A fastening device comprising in combination a safety pin having a base wire with a hook end, a holding assembly having a straight wire with a resilient pivotal connection to the hook end of the safety pin, an acute angular hook formed at the end of the said straight wire by a wire bent at an acute angle to said straight wire, the end of the wire of the acute angle hook being held normally in contact with the base wire of the safety pin by the said resilient pivotal connection, said connection permitting spacing of such end of the wire of the acute angle hook from the said straight wire.

MABEL A. BISPHAM.